United States Patent [19]

Matsuo et al.

[11] Patent Number: 4,755,268
[45] Date of Patent: Jul. 5, 1988

[54] PROCESS AND APPARATUS FOR PRODUCING SILVER-IONIC WATER

[76] Inventors: Yoshiaki Matsuo, 2-19-11, Omorihoncho, Ota-ku, Tokyo; Jin-ichi Ito, 1-2-1, Nishiwaseda, Shinjuku-ku, Tokyo; Katsue Oshima, 4-26-9, Shichirigahamahigashi, Kamadura-shi, Kanagawa-ken, all of Japan

[21] Appl. No.: 50,437

[22] Filed: May 18, 1987

[30] Foreign Application Priority Data

May 28, 1986 [JP] Japan .................................. 61-123133
Dec. 26, 1986 [JP] Japan .................................. 61-314792

[51] Int. Cl.$^4$ ............................................. C02F 1/46
[52] U.S. Cl. ..................................... 204/149; 204/131; 204/130; 204/269
[58] Field of Search ................. 204/130, 131, 149, 86, 204/269

[56] References Cited

U.S. PATENT DOCUMENTS 3,936,364  2/1976  Middle .................. 204/149

Primary Examiner—R. L. Andrews
Attorney, Agent, or Firm—Beveridge, DeGrandi & Weilacher

[57] ABSTRACT

A process for producing silver-ionic water, comprising;
a step of passing water through a first electrolytic cell chamber containing an anode and a cathode and provided with silver on the anode, under the application of a voltage, to dissolve out silver ions; and
a step of passing the water in which said silver ions have been dissolved out, through either one or both of an anode compartment and a cathode compartment of a second electrolytic cell chamber containing an anode and a cathode and separated into said anode compartment and said cathode compartment with a diaphragm formed between both of said electrodes.

The process is useful for producing acidic silver-ionic water and/or alkaline silver-ionic water without causing the formation of colloids even under relatively higher silver ion concentration.

Also disclosed are useful apparatus for practicing the above processes.

10 Claims, 3 Drawing Sheets

PROCESS AND APPARATUS FOR PRODUCING SILVER-IONIC WATER

BACKGROUND OF THE INVENTION

This invention relates to a process for producing silver-ionic water (or silver ion-containing water) used in the field of, for example, sanitary administration in processing, distribution and selling of foods, soil conditioning and cultivation promortion in agriculture, environmental sanitation in medical care, etc., and an apparatus for producing the same.

Silver-ionic water, which is less dangerous for human bodies and has an bactericidal action, has recently attracted notices as potable water, sterilized water and so forth.

In the present invention, the actions expected in silver ions include a bacteriostatic action against bacteria, an action of supplying activie oxygen to roots of plants, an action of supplying OH ions for the purpose of promoting photosynthesis in the cells of plants with a lower amount of light, and actions such as elimination of pains, hemostasis and promotion of a vulnerary action. Of these, the bacteriostatic action originates from the oxidation catalytic function inherent in silver acting on a cell membrane of bacteria, the silver concentration, and the pH of ionic water. Upon contact of silver ions with a bacterial body, the catalytic function of silver may cause a radical reaction in the unsaturated aliphatic acid constituting a hydrophobic part of a cell membrane of bacteria to hydrolyze the same. The cell membrane of bacteria thereby loses its function, aiming at stopping vital activities by inflow of water, and DNA and constitutents of a nuclear membrane may not be affected by the catalytic function of silver to remain in a sound form. Moreover, silver tends to be little accumulated inside a living body as compared with other metallic elements. From these facts, silver ions are considered to be little dangerous for human bodies and, from a genetic viewpoint also, cause no disorder in a fetus that may affect a next generation, and therefore, if conditions are adjusted, has a possibility to serve as a new bacteriostatic agent substituting conventional chemical medicaments.

Conventionally, the silver-ionic water has been produced by an apparatus embodying a process called a Katadyn process. This apparatus comprises an anode and a cathode, wherein the anode is provided with silver, and water is allowed to pass while a voltage is applied between both electrodes, whereby silver is ionized and dissolved out to give silver-ionic water.

However, the apparatus mentioned above is involved in a problem that the resulting silver-ionic water is substantially neutral, and, under the neutral condition, silver ions may be adsorbed on proteins and can have only a little chance for direct contact with the inside of a cell of a bacterial body when proteins are contained in water or bacteria are in contact with proteins, resulting in an extreme lowering of its bacteriostatic action. Specifically speaking based on an experimental work made by the present inventors, this silver-ionic water was brought into contact with bacteria in an aqueous solution in which proteins are dissolved, and also, separately, with bacteria adhered to proteins, but, because of the neutral environment, metallic ions were vigorously bonded to proteins, releasing ions, and was not able to enter the cells of bacteria when brought into contact with the bacteria, with the loss of the effect by silver ions and no achievement of the object.

To cope with the problem, the present inventors have made intensive studies. As a result, they have found that silver-ionic water having a given silver ion concentration under the acidic condition of pH 5 or less or the alkaline condition of pH 8 or more may have a remarkable bacteriostatic action against bacteria present together with proteins, with a silver ion concentration that may be less dangerous for human bodies, and that the acidic silver-ionic water has an action of supplying $O_2$ to roots of plants and the alkaline silver-ionic water, when supplied to plant cells, has an action of promoting photosynthesis.

As an apparatus for producing acidic or alkaline silver-ionic water, known is an apparatus as disclosed in Japanese Unexamined Patent Publication No. 97088/1985, for example. As shown in FIG. 3, this apparatus comprises an electrolytic cell 11 provided with an anode 12 comprising a silver electrode, and a cathode 13 comprising a carbon electrode or the like, wherein a cylindrical ion-exchange diaphragm 14 is disposed around the anode 12, which diaphragm 14 defines an anode compartment 15 and a cathode compartment 16 which are separated from each other. Water passes through branch pipes 17a and 17b of a conduit 17, and is led into the anode compartment 15 and the cathode compartment 16, respectively. One end of a feedback pipe 18 is connected to the bottom of the cathode compartment 16, and the other end of the feedback pipe 18 opens to an upper portion of the anode compartment 15. Water in the cathode compartment 15 circulates to the anode compartment 15 through the feedback pipe 18. Also, a take-out pipe 19 is connected to the bottom fo the anode compartment 15 and another take-out pipe 20 is connected to the bottom of the cathode compartment 16.

Thus, in this prior art apparatus, water is introduced into the anode compartment 15 and the cathode compartment 16 through the branch pipes 17a and 17b of the conduit 17, and allowed to circulate from the cathode compartment 16 to the anode compartment 15 trough the feedback pipe 18. Further, the water in the anode compartment 15 is taken out from the take-out pipe 19 and the water in the cathode compartment 16 is taken out from the take-out pipe 20. By applying a direct-current voltage to the anode 12 and the cathode 13, silver on the anode 12 is ionized to dissolve. Acidic silver-ionic water is taken out from the take-out pipe 19 of the anode compartment 15 and alkaline silver-ionic water is taken out from the take-out pipe 20 of the cathode compartment 16. Here, since the water in the cathode compartment 16 is allowed to circulate to the anode compartment 15 through the feedback pipe 18, the water taken out from the anode compartment 16 and the cathode compartment 16 may have substantially the same silver ion concentration.

However, in the above apparatus, a high voltage have had to be applied in order to attain the desired EC value by applying a voltage to the anode 12 and the cathode 13. Therefore, because of the silver electrode provided on the anode 12, if it is attempted to increase the silver ion concentration of the water to be taken out, silver particles beings to precipitate to form colloids when the silver ion concentration reaches a certain level. Thus, there has been a limit in increasing the silver ion concentration. Moreover, there has been a fear of adversely affecting human bodies when a large quantity of silver grains are precipitated to form colloids.

SUMMARY OF THE INVENTION

An object of the present invention is to provide a process, and an apparatus, for producing silver-ionic water, that can produce acidic silver-ionic water or alkaline silver-ionic water without causing the formation of colloids even under relatively higher silver ion concentration, and also that can produce silver-ionic water having electric conductance of 350 to 2000 $\mu\mho/cm^3$ at which the acidic side electrochemical potential can be increased.

Another object of the present invention is to provide a process, and an apparatus, for producing long term stable silver-ionic water, which makes it possible to produce silver-ionic water that can stably maintain a uniform silver ion concentration over a long period of time and also can attain high operational effects against target matters such as bacteria under relatively low concentration and even in the presence of proteins mixed.

According to a first embodiment of the present invention there is provided a process for producing silver-ionic water, comprising;

a step of passing water through a first electrolytic cell chamber containing an anode and a cathode and provided with silver on the anode, under the application of a voltage, to dissolve out silver ions; and a step of passing the water in which said silver ions have been dissolved out, through either one or both of an anode compartment and a cathode compartment of a second electrolytic cell chamber containing an anode and a cathode and separated into said anode compartment and said cathode compartment with a diaphragm formed between both of said electrodes.

As an apparatus for carrying out the above process according to the first embodiment of the present invention, there is provided an apparatus for producing silver-ionic water, comprising;

a first electrolytic cell chamber containing an anode and a cathode and provided with silver on the anode, a second electrolytic cell chamber containing an anode and a cathode and separated into an anode compartment and a cathode compartment with a diaphragm formed between both of said electrodes, and at least one of a flow path in which water is passed from said first electrolytic cell chamber through the anode compartment of said second electrolytic cell chamber and flowed out, and a flow path in which water is passed from said first electrolytic cell chamber through the cathode compartment of said second electrolytic cell chamber and flowed out.

According to a second embodiment of the present invention, there is a provided a process for producing silver-ionic water, comprising;

(a) subjecting water to a demineralizing treatment to decrease ionic substances in the water;

(b) adding an organic carboxylic acid to the ion-decreased water;

(c) passing the water to which the organic carboxylic acid has been added, through a first electrolytic cell chamber containing an anode and a cathode and provided with silver on the anode, under the application of a voltage, to dissolve out silver ions;

(d) passing under the application of a direct-current voltage the water in which said silver ions have been dissolved out, through at least a cathode compartment side of a second electrolytic cell chamber containing an anode and a cathode and separated into an anode compartment and the cathode compartment with a diaphragm formed between both of said electrodes; and (e) adding sodium chloride to the water having been passed through said cathode compartment so that silver may be present in the water as a soluble complex.

As an apparatus for carrying out the above process according to the second embodiment of the present invention, there is provided an apparatus for producing silver-ionic water, comprising;

an ion exchange chamber filled with an iron exchange material;

a first mixing bath for adding an organic carboxylic acid;

a first electrolytic cell chamber containing an anode and a cathode and provided with silver on the anode;

a second electrolytic cell chamber having an anode and a cathode and separated into an anode compartment and a cathode compartment with a diaphragm formed between both of said electrodes;

a second mixing bath for adding sodium chloride; and a flow path in which water is flowed out after being passed from said ion exchange chamber through said first mixing bath, said first electrolytic cell chamber, the cathode compartment of said second electrolytic cell chamber and said second mixing bath.

DESCRIPTION OF THE PREFERRED EMBODIMENTS

According to the present invention, acidic silver-ionic water such as $Ag^+$-containing water can be obtained by dissolving out silver ions in water in the first electrolytic cell chamber and passing this water through the anode compartment of the second electrolytic cell chamber, and alkaline silver-ionic water such as water containing $Ag(OH)_2^-$, $Ag_2(OH)^+$, etc. can be obtained by passing the water treated in the first electrolytic cell chamber through the cathode compartment of the second electrolytic cell chamber. Also, in the apparatus for carrying out this process, the voltage, current, and flow rate of water in the first electrolytic cell chamber may be controlled to attain a desired silver ion concentration, without formation of colloids of silver particles even when the silver ion concentration has been increased. This is because the desired silver ion concentration is controlled in the first electrolytic cell chamber and the water having been made silver-ionic is made acid or alkaline in the second electrolytic cell chamber. According to the apparatus of the present invention, it is also possible to produce an acidic silver-ionic water having an increased acidic side electrochemical potential and an alkaline silver-ionic water to have respectively the desired pH value, EC value and amount of dissolved oxygen by controlling the voltage, current, and flow rate of water in the second electrolytic cell chamber.

According to a preferred embodiment of the present invention, there are provided, in addition to the above water flow paths, a flow path in which the water is directly passed though the above anode compartment of the second electrolytic cell chamber and flowed out, and another flow path in which the water is directly passed through the above cathode compartment of the second electrolytic cell chamber and flowed out. According to this embodiment, water is passed from the first electrolytic cell chamber to the second electrolytic cell chamber and at the same time another water is directly passed through the cathode compartment of the second electrolytic cell chamber, so that, while controlling the flow rate or both the water, desired acidic silver-ionic water only can be taken out from the anode compartment of the second electrolytic cell chamber. Alternatively, water is passed from the first electrolytic cell chamber to the anode compartment of the second electrolytic cell chamber and at the same time another water is directly passed through the anode compartment of the second electrolytic cell chamber, so that, while controlling the flow rate of both the water, desired alkaline silver-ionic water only can be taken out from the cathode compartment of the second electrolytic cell chamber.

Figure 1:
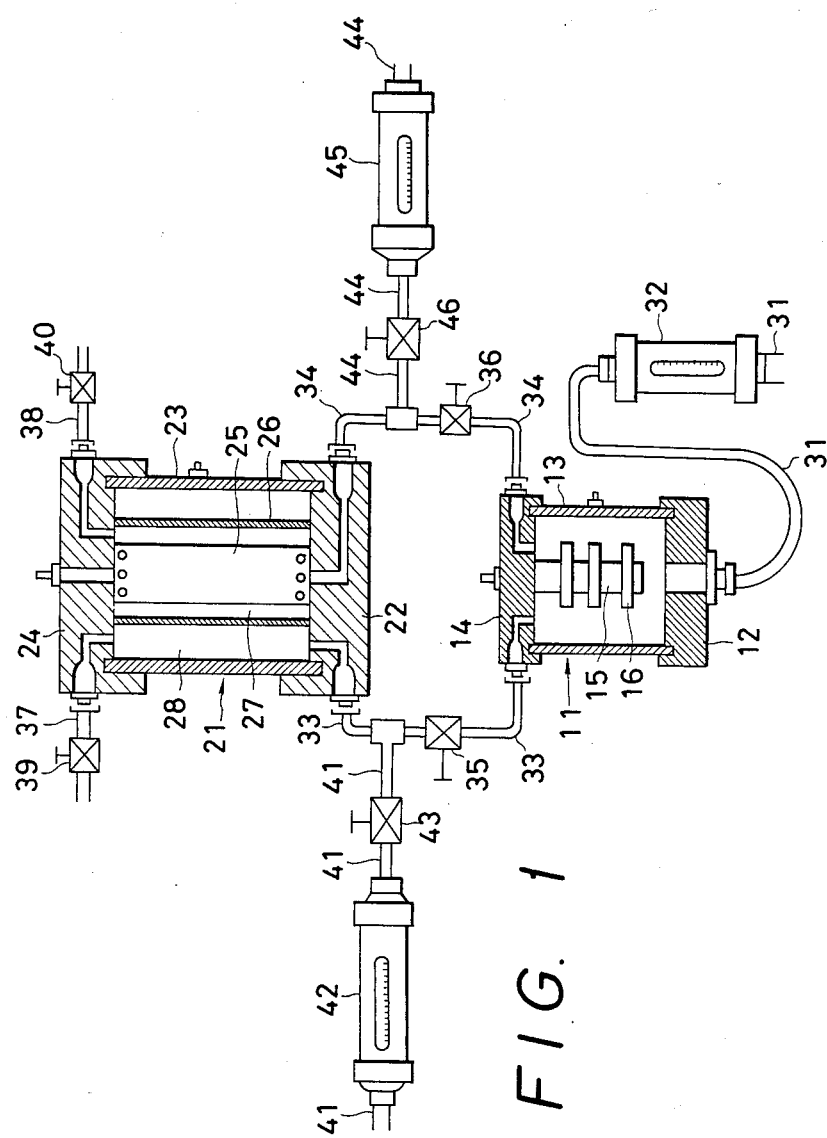
FIG. 1 is a partially cross-sectional view showing an embodiment of the apparatus for producing silver-ionic water according to the first embodiment of the present invention.

FIG. 1 illustrates an example of the apparatus for producing silver-ionic water according to the first embodiment of the present invention.

The apparatus of FIG. 1 chiefly comprises a first electrolytic cell chamber 11 and a second electrolytic cell chamber 21. The first electrolytic cell chamber 11 is enclosed by a bottom plate 12 comprising a non-conductive material, a cathode plate 13 surrounding the outer periphery and made of stainless steel or the like, and a cover plate 14 made of a non-conductive material. Through the cover plate 14, an anode rod 15 is inserted in the manner that the lower end portion thereof may be inward extended. Also, the anode rod 15 is provided with silver or silver alloy 16.

To the bottom plate 12, a first water-feeding pipe 31 is connected via a flowmeter 32 provided on the way of the pipe so that water may be introduced into the first electrolytic cell chamber 11 through the pipe 31. To the cover plate 14, connecting pipes 33 and 34 are connected so that the water in the first electrolytic cell chamber 11 can be led out of it. The connecting pipe 33 is provided with a valve 35 and the connecting pipe 34 is provided with a valve 36.

On the other hand, the second electrolytic cell chamber 21 is enclosed by a bottom plate 22 made of a non-conductive material, a cathode plate 23 surrounding the outer periphery and made of stainless steel or the like, and a cover plate 24 made of a non-conductive material. To the cover plate 24, an anode plate 25 is fixed in the matter that it may be inward extended. In the inside of the second electrolytic cell chamber 21, a cylindrical diaphragm 26 is arranged so as to surround the anode plate 25, which diaphragm 26 partitions an anode compartment 27 and a cathode compartment 28. The diaphragm 26 has properties that it allows ions such as $Ca^{++}$, $Mg^{++}$, $Na^+$, $K^+$, etc. to pass from the anode compartment 27 to the cathode compartment 28 and allows ions such as $Cl^-$, $SO_4^{--}$, $HCO_3^-$, etc. to pass from the cathode compartment 28 to the anode compartment 27, to prevent reverse flowing of them.

The aforesaid connecting pipes 33 and 34 are connected to the bottom plate 22, of which the connecting pipe 33 is led to the above cathode compartment 28 and the connecting pipe 34 is led to the above anode compartment 27. Lead-out pipes 37 and 38 are connected to the cover plate 24, of which the lead-out pipe 37 is led to the cathode compartment 28 and the lead-out pipe 38 is led to the anode compartment 27. The lead-out pipes 37 and 38 are provided with valves 39 and 40, respectively.

A second water-feeding pipe 41 is connected between the valve 35 of the connecting pipe 34 and the bottom plate 22 via a flowmeter 42 and a valve 43. A third water-feeding pipe 44 is connected between the valve 36 of of the connecting pipe 34 and the bottom plate 22 via a flowmeter 44 and a valve 46.

To simultaneously obtain the acidic silver-ionic water and the alkaline silver-ionic water by use of this apparatus, valves 36, 36, 39 and 40 are opened, and valves 43 and 46 are closed, so that water is fed from the first water-feeding pipe 31. The water thus fed from the first water-feeding pipe 31 is led into the first electrolytic cell chamber 11, where silver ions are formed. Then, part of the water containing silver ions is led into the anode compartment 27 of the second electrolytic cell chamber 21 through the connecting pipe 34, and taken out from the lead-out pipe 38 in the form of acidic silver-ionic (e.g. $Ag^+$) water formed in the anode compartment 27 and having an electric conductance of 350 to 2000 $\mu$ /cm$^3$. At the same time therewith, remaining part of the water containing silver ions is led into the cathode compartment 28 of the second electrolytic cell chamber 21 through the connecting pipe 33, and taken out from the lead-out pipe 37 in the form of alkaline silver-ionic (e.g. $Ag(OH)_2^-$, $Ag_2(OH)^+$) water formed in the cathode compartment 28.

To obtain only the acidic silver-ionic water by use of the above apparatus, procedures may be taken as follows: Valves 36, 39, 40 and 43 are opened, and valves 35 and 46 are closed. Under such a state, water is fed under pressure from the first water-feeding pipe 31 and the second water-feeding pipe 41, respectively. The water fed from the first water-feeding pipe 31 passes through the first electrolytic cell chamber 11, the connecting pipe 34 and the anode compartment 27 of the second electrolytic cell chamber 21, and flows out from the lead-out pipe 38. Also, the water fed from the second water-feeding pipe 41 passes through the connecting pipe 33 and the cathode compartment 28 of the second electrolytic cell chamber 21, and flows out from the lead-out pipe 37. Here, the flow rate of the water flowing through both the flow paths is controlled as necessary while watching the flowmeters 32 and 42. Under such a state, a direct-current voltage is applied between the anode rod 15 and cathode plate 13 of the first electrolytic cell chamber 11, and also a direct-current voltage is applied between the anode plate 25 and cathode plate 23 of the second electrolytic cell chamber 21. Taking these procedures, the water fed from the first water-feeding pipe 31 is led into the first electrolytic cell chamber 11, where silver ions are formed, led into the anode compartment 27 of the second electrolytic cell chamber 21 through the connecting pipe 34, and taken out from the lead-out pipe 38 in the form of acidic silver-ionic water such as $Ag^+$ ionic water formed in the anode compartment 27 and having an electric conductance of 350 to 2000 $\mu\upsilon$/cm$^3$.

To obtain only the alkaline silver-ionic water by use of the above apparatus, valves 35, 39, 40 and 46 are open, and valves 36 and 43 are closed. Water is fed from the first water-feeding pipe 31 and the third water-feeding pipe 44, respectively. Taking these procedures, the water fed from the first water-feeding pipe 31 is led to the first electrolytic cell chamber 11, where silver ions are formed, led into the cathode compartment 28 of the second electrolytic cell chamber 21 through the connecting pipe 33, and taken out from the lead-out pipe 39 in the form of alkaline silver-ionic water such as Ag(OH)$_2^-$ or Ag$_2$(OH)$^+$ water formed in the cathode compartment 28.

In this apparatus, acidic or alkaline silver-ionic water having a desired silver ion concentration and pH can be obtained by controlling the flow rate of the water flowing though the respective flow paths, the voltage to be applied to the anode rod 15 and cathode plate 13 of the first electrolytic cell chamber 11 and the voltage to be applied to the anode plate 25 and cathode plate 23 of the second electrolytic cell chamber 21.

In this instance, the controlling of the silver ion concentration can be varied chiefly depending on the voltage applied to the anode rod 15 and the cathode plate 13 of the first electrolytic cell chamber 11. Speaking more precisely, the silver ion concentration can be controlled according to the product of the applied voltage in the first electrolytic cell chamber 11 and the electric current flowing in water at that time; in other words, the electric power consumption. Since the electric current flowing in water can be determined according to the applied voltage, the electric conductance of water and the flow rate of water, it anyway follows that the silver ion concentration can be controlled according to the applied voltage, the electric conductance of water and the flow rate of water. Accordingly, it follows that the higher the applied voltage, the electric conductance of water and the flow rate of water are, the higher the silver ion concentration is made.

Results obtained by experiments actually carried out by use of the above apparatus are as follows: The flow rate of the water flowing through the first electrolytic cell chamber 11 was made to be 4.5 lit/min. The electric conductance of the water used was 182 $\mu\sigma$/cm$^3$. The voltage applied to the second electrolytic cell chamber 21 was made constant at 100V. Under these conditions, with varied voltage applied to the first electrolytic cell chamber 11, the water mentioned above was passed through the first electrolytic cell chamber 11, and the water passed there was led through two divided courses to be taken out after being passed respectively through the anode compartment 27 and cathode compartment 28 of the second electrolytic cell chamber 21. The concentration of silver ions contained in the water thus taken out was measured by atomic absorption. When the voltage applied to the first electrolytic cell chamber 11 was same, the water taken out from the anode compartment 27 and the water taken out from the cathode compartment 28 had substantially the same silver ion concentration. The relationship between the electric power consumption in the first electrolytic cell chamber 11 and the silver ion concentration of the water taken out from the second electrolytic cell chamber 21, thus obtained, is shown in Table 1. It is seen from Table 1 that the higher the electric power consumption in the first electrolytic cell chamber is, the higher the silver ion concentration is.

Figure 3:
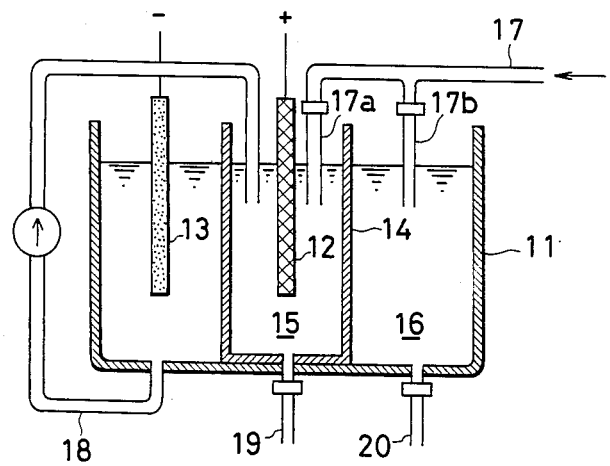
FIG. 3 is a cross-sectional view showing a conventional apparatus for producing silver-ionic water according to a prior art.

For comparison, similar experiment was carried out in the following manner by use of the apparatus shown in FIG. 3: In the apparauts shown in FIG. 3, water was fed from the water-feeding pipe 17 at a rate of 4.5 lit/min, and the water divided in substantially equal amounts was led into the anode compartment 15 and the cathode compartment 16. Then, the water in the cathode compartment 16 was circulated to the anode compartment 15 through the feedback pipe 18. Further, water was taken out from the take-out pipe 19 of the anode compartment 15 and the take-out pipe 20 of the cathode compartment 16, respectively. The electric conductance of the water was 182 $\mu\sigma$/cm$^3$, same as the above. Under these conditions, the experiment was carried out with varied voltage applied to the anode 12 and the cathode 13, and the concentration of silver ions contained in the water taken out was measured by atomic absorption. In this apparatus also, the water taken out from the anode compartment 15 and the water taken out from the cathode compartment 16 had substantially the same silver ion concentration, when the voltage was kept constant. The relationship between the electric power consumption in the electrolytic cell and the concentration of silver ions contained in the water taken out, thus obtained, is shown in Table 2. It is seen from Table 2 that the silver ion concentration reaches a maximum at the electric power of 36W, and the silver ion concentration is lowered on the contrary even if the electric power is made higher. It was also actually confirmed that silver particles were precipitated to form colloids when the electric power consumption exceeded 36W.

TABLE 1

| Electric power consumption (W) | Silver ion concentration (ppm) |
| --- | --- |
| 3.4 | 0.70 |
| 12.6 | 1.50 |
| 27.9 | 2.14 |
| 48.4 | 2.94 |

TABLE 2

| Electric power consumption (W) | Silver ion concentration (ppm) |
| --- | --- |
| 2.6 | 0.55 |
| 9.4 | 1.15 |
| 20.7 | 1.58 |
| 36.0 | 1.94 |
| 55.0 | 1.79 |
| 67.7 | 1.70 |

On the other hand, in the apparatus of the present invention, the pH can be chiefly controlled by the electric power consumption in the second electrolytic cell chamber 21. This electric power consumption can be determined by the voltage applied tt the anode plate 25 and the cathode plate 23, and the electric current flowing in water. The electric current flowing in water can be varied depending on the flow rate of water and the electric conductance of water, when the applied voltage is kept constant. Now, the voltage applied to the second electrolytic cell chamber 21 was made constant at 100 V, with varied flow rate of the water flowing in the anode compartment 27 and the cathode compartment 28, and the pH of the acidic silver-ionic water taken out from the anode compartment 27 and the pH of the alkaline silver-ionic water taken out from the cathode compartment 28 were respectively measured. Results obtained are shown in Table 3 (the acidic silver-ionic water) and Table 4 (the alkaline silver-ionic water). Table 3 and Table 4 tell that the smaller the flow rate is, the more the electric current is, and, as a result, the higher the electric power consumption is. It is seen from Table 3 that the pH decreases with increase in the electric power consumption, in respect of the acidic silver-ionic water taken out from the anode compartment 27. It is also seen from Table 4 that the pH increases with increase in the electric power consumption, in respect of the alkaline silver-ionic water taken out from the cathode compartment 28.

TABLE 3

| (Acidic silver-ionic water) | | | |
|---|---|---|---|
| Flow rate (lit/min) | Voltage (V) | Current (A) | pH value |
| 10 | 100 | 4 | 5.13 |
| 9 | 100 | 5 | 4.25 |
| 2 | 100 | 12 | 3.29 |

TABLE 4

| (Alkaline silver-ionic water) | | | |
|---|---|---|---|
| Flow rate (lit/min) | Voltage (V) | Current (A) | pH value |
| 10 | 100 | 4 | 7.90 |
| 9 | 100 | 5 | 9.09 |
| 4.5 | 100 | 12 | 10.5 |

As a further feature in the apparatus of the present invention, the silver ions, having been dissolved out in the first electrolytic cell chamber 11, may be passed through the anode compartment 27 of the second electrolytic cell chamber 21, whereby the acidic silver-ionic water having a desired electrical conductance can be obtained. More specifically, the electric power consumption in the first electrolytic cell chamber 11 and the electric power consumption in the second electrolytic cell chamber 21 may be controlled, whereby the electric conductance of the acidic silver-ionic water taken out from the anode compartment 27 of the second electrolytic cell chamber 21 can be varied in the range of 350 to 2000 $\mu\text{U}/\text{cm}^3$, and thus the electric conductance can be selected depending on what the silver-ionic water is used for. Increasing the electric conductance like this, it is made possible to improve the cell permeability of silver ion to enhance the bacteriostatic action thereof, to give electrochemical potential to trace elements to enhance a complex formation ability or an ability for metal complexes to be absorbed into plants, and further to supply active oxygen to the roots of plants.

TEST EXAMPLE 1

Using the above apparatus according to the first embodiment of the present invention, acidic silver-ionic water each having the pH of 3.5 and a silver ion concentration of 800 ppb, 1,200 ppb, 1,600 ppb and 2,000 ppb was prepared. Thereafter, a platinum loop each of *Escherichia coli* and Staphylococcus was inoculated into each solution, followed by addition of a 0.1% broth, and the movements (viable cell counts) of the bacteria were observed with time lapse while culturing them at 35° C. As a result, the viable cell counts on Escherichia coli were as shown in Table 5.

As to Staphylococcus, the state of growth thereof was observed based on the turbidity of the solutions to obtain the results as shown in Table 6. Thus, the acidic silver-ionic water was found to have a remarkable bacteriostatic action.

The *Escherichia coli* and Staphylococcus used in the above were further cultured to repeat experiments similar to the above several times, but there appeared no bacteria resistant to silver ions, showing the same bacteriostatic action as in the first instance. Thus, there is a feature that the appearance of resistant bacteria, which has been very usual in using conventional medicaments, is not seen at all in using this silver ions.

TABLE 5

| Contact time | Silver ion concentration | | | | |
|---|---|---|---|---|---|
| | Control 0 | 800 ppb | 1200 ppb | 1600 ppb | 2000 ppb |
| 10 min | 2000 | 160 | 290 | 60 | 180 |
| 2 hrs | 3500 | 70 | 70 | 30 | 30 |
| 4 hrs | 20000 | 30 | 20 | 0 | 0 |
| 6 hrs | 55000 | 20 | 10 | 0 | 0 |
| 24 hrs | 19000000 | 30 | 0 | 0 | 0 |
| 48 hrs | 80000000 | 500000 | 500000 | 500000 | 0 |

TABLE 6

| Tests on Staphylococcus suspension | | | | | |
|---|---|---|---|---|---|
| Contact time | Control | 800 | 1200 | 1600 | 2000 ppb |
| 24 hrs | + | − | − | − | − |
| 48 hrs | + | + | − | − | − |
| 72 hrs | + | + | − | − | − |

Next, prepared was silver-ionic water each having a silver ion concentration of 1 ppm, 0.5 ppm and 0.2 ppm, the pH of which was varied respectively to be 10, 9, 8, 7, 6, 5, 4 and 3. On the other hand, Staphylococcus and *Escherichia coli* were subcultured for 3 days with use of an ordinary broth medium. Also, general various bacteria were cultured from white coffee. The above Staphylococcus, *Escherichia coli* and general various bacteria were collected by the number of $10^5$ for each, and brought into contact with each of the above silver-ionic water for 5 minutes to measure the viable cell counts. Results obtained were as shown in Table 7. As will be seen from Table 7, the bacteriostatic action tends to become remarkable at the pH of 5 or less or the pH of 8 or more.

TABLE 7

| | Staphylococcus | | | *Escherichia coli* | | | General various bacteria | | |
|---|---|---|---|---|---|---|---|---|---|
| | Ag ion concentration: | | | | | | | | |
| | 0.2 ppm | 0.5 ppm | 1 ppm | 0.2 ppm | 0.5 ppm | 1 ppm | 0.2 ppm | 0.5 ppm | 1 ppm |
| pH 10 | 0 | 0 | 0 | 0 | 0 | 0 | 0 | 0 | 0 |
| pH 9 | 10 | 0 | 0 | 70 | 0 | 0 | $8.9 \times 10^3$ | 0 | 0 |
| pH 8 | $1.1 \times 10^4$ | 43 | 1 | $9.1 \times 10^3$ | 2 | 1 | $2.1 \times 10^4$ | $10 \times 10^3$ | $2.0 \times 10^2$ |
| pH 7 | $5.3 \times 10^4$ | $3.7 \times 10^3$ | $3.6 \times 10^2$ | $3.6 \times 10^4$ | $9.4 \times 10^3$ | $5.6 \times 10^2$ | $8.2 \times 10^4$ | $6.4 \times 10^3$ | $2.5 \times 10^2$ |
| pH 6 | $9.8 \times 10^3$ | $1.1 \times 10^3$ | $2.1 \times 10^2$ | $2.1 \times 10^4$ | $6.2 \times 10^3$ | $3.1 \times 10^2$ | $6.1 \times 10^4$ | $5.1 \times 10^3$ | $1.9 \times 10^2$ |
| pH 5 | $5.5 \times 10^3$ | $8.2 \times 10^3$ | 27 | $8.7 \times 10^3$ | $7.2 \times 10^2$ | 50 | $9.1 \times 10^3$ | $2.6 \times 10^3$ | $1.1 \times 10^2$ |
| pH 4 | $4.2 \times 10^3$ | 77 | 3 | $3.6 \times 10^3$ | 12 | 0 | $4.5 \times 10^3$ | 610 | 0 |
| pH 3 | 10 | 0 | 0 | 2 | 0 | 0 | 87 | 0 | 0 |

Subsequently, using acidic silver-ionic water, tomatos were cultivated according to hydrophonics under the following conditions:

Kind of tomato: Ponderozer

Cultivation room: In a glass room not heated.

Medium: Rock wool; culture solution circulation system.

Culture solution: An aqueous solution obtained by diluting "Bioaqua" (trademark; available from Sanraiku K.K. to 1/3000 with purified water.

$Ag^+$ ionic water: An aqueous solution of pH 2.4, diluted to 1/2000. Water was fed for 10 minutes every two hours in twenty-four hours.

Those cultivated without using the silver-ionic water were used as a control. Properties of the both culture solutions are shown in Table 8. The number of mature berries, average days for maturation, and longest term for maturation of the tomatos cultivated by use of both the culture solutions are shown in Table 9.

It is seen from Tables 7 and 8 that the maturation of tomatos is promoted by the acidic silver-ionic water.

TABLE 8

| Properties | Purified water + Bioaqua | Silver-ionic water + Bioaqua |
|---|---|---|
| pH | 7.19 | 5.0 |
| EC | 0.00 | 0.64 |
| mʊ | 342 | 638 |
| DO | 9.1 | 21.0 |

TABLE 9

| Planted (April 5th) | Number of mature berries | Average days for maturation (day) | Longest term for maturation (day) |
|---|---|---|---|
| Purified water + Bioaqua; diluted to 1/1500 | 44 | 58.5 | 73 |
| Silver-ionic water + Bioaqua; diluted to 1/2000 | 57 | 50.1 | 54 |

Further, using alkaline silver-ionic [$Ag(OH)_2^-$, $Ag_2(OH)^+$, etc.] water (pH: 8; silver ion concentration: 50 ppb), radishes *Kaiware* were cultivated under the following conditions:

Kind: Radish *Kaiware*

Cultivation room: wooden dark room of 50 cm wide, 2 m and 50 cm long and 1 m high.

Light source: Fluorescent lamp, 40W×100V (one).

Medium: Urethane cotton.

Water supply: Showered for 30 seconds every 2 hours and 30 minutes according to a ceiling shower system.

Seedling culture box: Made of plastics, provided with drainage holes bored over the whole face of the bottom.

Seedling culture period: 4 days.

For comparison, similar cultivation was carried out with use of general city water (pH 7) and alkaline ionic water (pH 8; containing no silver-ionic water). The germination rate, yield, state of rot of roots were examined for each group. Results obtained are shown in Table 10.

From Table 10, the alkaline silver-ionic water is found to improve the germination rate and yield, and also lessen the rot of roots.

TABLE 10

| | Amount of light (lux) | Germination rate (%) | Yield (g) | Rot of roots |
|---|---|---|---|---|
| General city water (pH 7) | 1100 | 75 | 750 | Pulpy state |
| Alkaline ionic water (pH 8) | 1100 | 75 | 800 | Pulpy state |
| $Ag(OH)_2^-$, $Ag_2(OH)^+$, etc. ionic water (pH 8) | 1100 | 96 | 1100 | None |

The silver-ionic water obtained by the apparatus of the present invention can be utilized, for example, in preservation invention can be utilzed, for example, in preservation of food, sterilization of tableware or kitchens, sterilization of the inside of refrigerators, etc. There can be also expected bacteriostatic effects on noodles and fish-paste products such as *kamaboko* (boiled fish paste), or effects of preventing spoilage of food by washing food such as meat and vegetables. Use in activation of plants is further expected, suggesting a possibility of wide utilization.

As described above, according to the first embodiment of the present invention, silver ions are dissolved out in the first electrolytic cell chamber, and the water containing silver ions is led into the second electrolytic cell chamber to be formed into acidic silver-ionic water or alkaline silver-ionic water with desired silver ion concentration and pH by controlling valves and by controlling voltage and electric current. Moreover, the acidic or alkaline silver-ionic water can be produced without formation of silver colloids even under relatively higher silver ion concentration. After the silver ions are dissolved out in the first electrolytic cell chamber, the water containing silver ions is led to the anode compartment of the second electrolytic cell chamber, whereby it is possible to increase the electrochemical potential to obtain acidic silver-ionic water having higher electric conductance.

The second preferred embodiment of the present invention will be described below in detail.

In the process for producing silver-ionic water according to the second embodiment of the present invention, the water to be used is first subjected to demineralization treatment in step a). In general, water such as city water and well water contains ionic substances including cataions such as $Ca_2^+$ ions, $Mg_2^+$ ions and $Na^+$ ions, and anions such as $HCO^-$ ions, $SO_4^-$ ions, $Cl^-$ ions and silica-colloidal organic acids. Thus, as will be also seen from its electric conductance which is 80 to 450 $\mu\mho/cm^3$, components in water can not be uniform and no homogeneous water is obtainable. In order to obtain stable and homogeneous silver-ionic water, it is required to make uniform the components of water. For example, it is necessary to pass water through ion-exchange materials such as ion-exchange resins to decrease cations and anions to a certain level, thereby making uniform the components of water. Here, the water having been subjected to ion-decreasing treatment is desired to have an electric conductance of 30 to 150 $\mu\mho/cm^3$, more preferably 40 to 80 $\mu\mho/cm^3$. The water having an electric conductance of less than 30 $\mu\mho/cm^3$ after the ion-decreasing treatment may cause inconveniences such that necessary trace elements can not reach the necessary amounts, and that, since an organic carboxylic acid is added to facilitate the electrolysis, sourness may become strong if it is attempted to obtain the desired EC value by increasing the amount of the organic carboxylic acid. The water having an electric conductance of more than 150 $\mu\mho/cm^3$ after the ion-decreasing treatment may cause an inconvenience such that $Cl^-$ react with $Ag^+$ to make the water cloudy with formation of colloids, causing precipitation.

To the water thus demineralized, an organic carboxylic acid is next added in step (b). As mentioned above, removal of ions in water may cause a lowering of the electric conductance, to make it difficult to smoothly proceed with the electrolysis if no countermeasure is taken. Accordingly, an ionizing compound is required to be added to increase the electric conductance of the water and to facilitate the electrolysis. In the process of the present invention, an organic carboxylic acid, particularly preferably acetic acid, is used as the ionizing compound. The organic carboxylic acid, for example, acetic acid, is ionized in water to give a carboxylic group ion $CH_3COO^-$ and a hydroxyl group ion $H^+$. These ions may not cause precipitation reaction for silver ions produced by electrolysis in the subsequent step (c), and yet can act on the silver ions in the final step (e) to contribute the formation of a complex. Such an organic carboxylic acid may be added to the ion-decreased water preferably in an amount of 0.01 to 0.4% by weight, most preferably about 0.06% by weight, based on the water.

The amount less than 0.01% by weight, of the organic carboxylic acid to be added may cause an inconvenience that the conditions for the electrolysis can be controlled only with difficulty, and the amount more than 0.4% by weight, of the organic carboxylic acid to be added may cause an inconvenience that the silver-ionic water may have an acid taste.

The water to which the organic carboxylic acid has been thus added is then led to step (c) and, under application of a voltage, passed through the first electrolytic cell chamber containing an anode and a cathode and provided with silver on the anode, where silver ions are dissolved out in the water. Subsequently, the water containing silver ions is led to the next step (d) and, under the application of a voltage, passed through the second electolytic cell chamber containing an anode and a cathode and separated into an anode compartment and the cathode compartment with a diaphragm formed between both of said electrodes, and it is important that at least the ionic water passed through the cathode compartment is led to the next step. In the water thus taken out from the cathode compartment, $Ag(OH)_2^-$ ions, $CH_3COO^-$ ions, etc. are presumed to have been dissolved. The water obtained from the first electrolytic cell chamber and containing silver ions may otherwise be passed simultaneously through both the anode compartment and cathode compartment of the second electrolytic cell chamber. In this instance, acidic silver-ionic water such as $Ag^+$ ionic water can be obtained from the anode compartment. However, when it is unnecessary to produce the water in which acidic ions such as $Ag^+$ have been dissolved, ordinary untreated water may be led to the anode compartment and flowed out of the system as it is. In the electrolysis steps as mentioned here, a desired silver ion concentration can be attained by controlling the voltage, electric current and flow rate of water in the first electrolytic cell chamber. There also occurs no formation of colloids of silver particles even if the silver ion concentration is increased. This is because the silver ion cocentration is controlled in the first electrolytic cell chamber, and the water having thus been made silver-ionic is made more stable in the second electrolytic cell chamber.

The alkaline silver-ionic water thus obtained, in which $Ag(OH)_2^-$ ions, $CH_3COO^-$ ions, etc. have been dissolved, is next led into a treatment bath in step (e), where NaCl is added in a given amount. The NaCl added may react with the alkaline silver ions such as $Ag(OH)_2^-$ ions and $CH_3COO^-$ ions, whereby silver is converted into a soluble complex and the pH of the water once falls to pH 3.8, and gradually rises until it reaches about pH 4.2. The mechanism of this reaction has not been made clear in detail, but, it is presumed that complexes such as $AgCH_3COO^-$, $AgCl_2^-$, $AgCl_3^{2-}$, etc. are formed in the water and these are stably dissolved in it. The amount of NaCl to be added in step (e) may be preferably 1 to 10% by weight based on the water. The amount less than 1% by weight may cause an inconvenience that clouding and precipitation due to AgCl may be caused to form colloid particles, and the amount more than 10% by weight may cause an inconvenience that precipitation due to an excesive chlorine amount may be caused.

The silver-ionic water thus obtained, which contains silver dissolved in the water in the form of complexes such as $AgCH_3COO^-$, $AgCl_2^-$ and $AgCl_3^{2-}$, etc., may hardly cause the coaggulation or precipitation and can be stably preserved for a long period of time. Moreover, it was made clear that, although the monovalent silver ions contained in the conventional silver-ionic water is usually unstable and may react by the action of light to cause halogenation, the silver-ionic water obtained according to the present invention may not cause any reaction at all even by irradiation of light, and can be stably preserved for a long period of time. Also, as compared with the conventional silver-ionic water in which $Ag^+$ ions, $Ag(OH)_2^-$ ions, etc. are dissolved, the bacteriostatic action has been made stronger. More specifically, when, for example, the silver-ionic water obtained in the prsent invention is administered in a living body, it can be harmonized with the large quantity of $Cl^-$ ions in the extracellular fluid in the body, along which it reaches target cell membranes or bacteria while retaining the state of complex salts, thereby bringing about a higher bacteriostatic action even with lower concentration. Also, the silver-ionic water obtained according to the present invention can have remarkable effects against bacteria present under the water content of about 30% in food, and can achieve an excellent bacteriostatic effect under the concentration quite harmless to human bodies. Still also, the silver-ionic water obtained according to the present invention contains the organic carboxylic acid, and, as the organic carboxylic acid has an action to germinate sporular bacteria, can advantageously have the bacteriostatic action on the sporular bacteria immediately after germination.

In the apparatus for carrying out the process for producing silver-ionic water according to the second embodiment of the present invention, there may be formed at least a flow path in which the water is passed from the ion-exchange chamber through the first mixing bath, the first electrolytic cell chamber, the cathode compartment of the second electrolytic cell chamber, and the second mixing bath, and then flowed out. However, in an apparatus for simultaneously producing the acidic silver-ionic water as mentioned above, there may be also provided a flow path in which the water is passed from the ion-exchange chamber through the first mixing bath, the first electrolytic cell chamber, and the anode compartment of the second electrolytic cell chamber, and then flowed out. also, in an apparatus that do not produce such acidic silver-ionic water, there may be additionally provided a flow path in which the water is passed through the anode compartment of the second electrolytic cell chamber and flowed out. As a matter of course, it is also possible to provide both of these flow paths in one apparatus.

Figure 2:
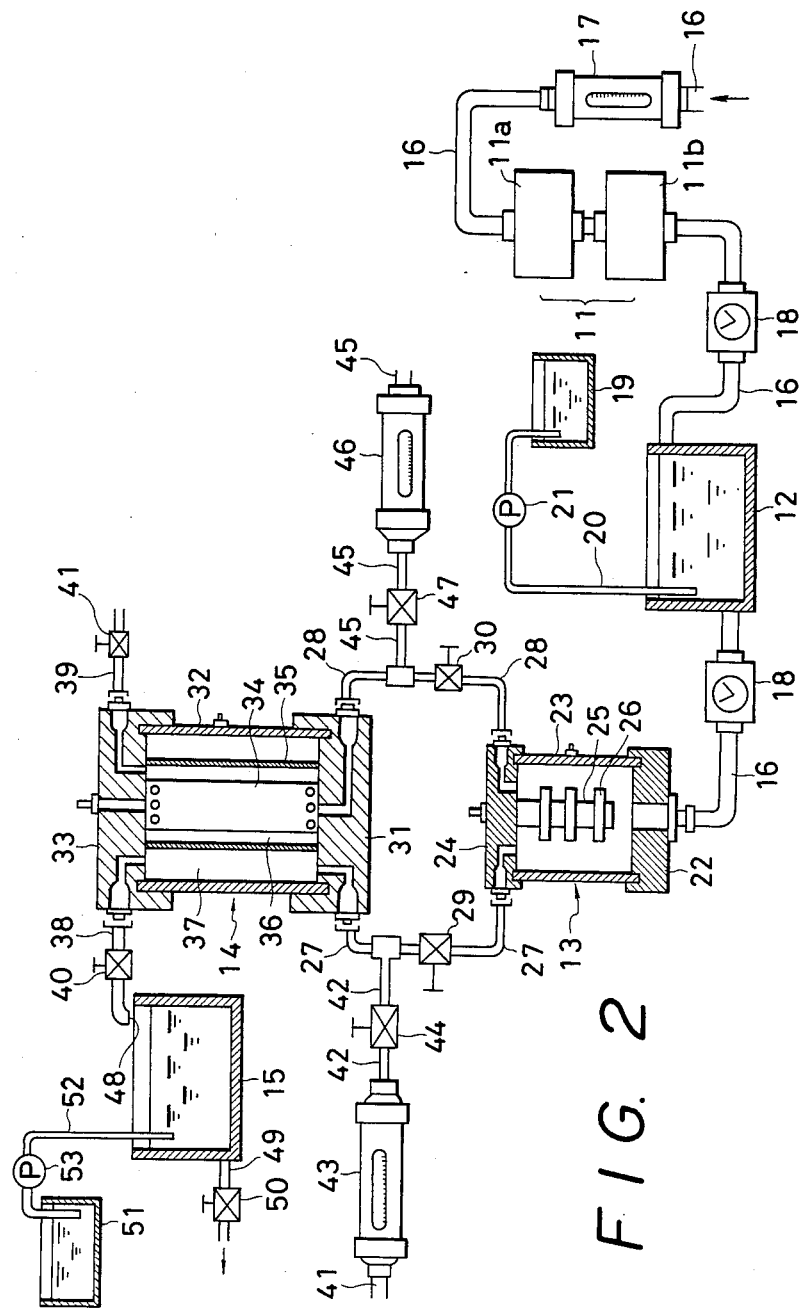
FIG. 2 is a partially cross-sectional view showing another embodiment of the apparatus for producing silver-ionic water according to the second embodiment of the present invention.

FIG. 2 illustrates an example of the apparatus for producing silver-ionic water according to the second embodiment of the present invention.

This apparatus chiefly comprises an ion-exchange chamber 11, a first mixing bath 12, a first electrolytic cell chamber 13, a second electrolytic cell chamber 14, and a second mixing bath 15.

In this apparatus, a first water pipe 16 is connected to the ion-exchange chamber via a flowmeter 17 on the way of the pipe. The ion-exchange chamber 11 comprises an anion-exchange compartment 11a and a cation-exchange compartment 11b, in the insides of which anio-exchange resins and cation-exchange resins are filled, respectively.

This ion-exchange chamber 11 is connected to the first mixing bath 12 by means of the first water pipe 16, on the way of which there is provided an EC (electric conductance) control detector 18. To the first mixing bath 12, an acetic acid-leading pipe 20 is extended from an acetic acid solution tank 19 via a measuring pump 21 on the way of the pipe. The first mixing bath 12 is further connected to the first electrolytic cell chamber 13 through the first water pipe 16, on the way of which there is provided another EC control detector 18.

The first electrolytic cell chamber 13 is enclosed by a bottom plate 22 comprising a non-conductive material, a cathode plate 23 surrounding the outer periphery and made of stainless steel or the like, and a cover plate 24 made of a non-conductive material. Through the cover plate 24, an anode rod 25 is inserted in the manner that the lower end portion thereof may be inward extended. Also, the anode rod 25 is provided with silver or silver alloy 26. To the cover plate 24, connecting pipes 27 and 28 are connected so that the water in the first electrolytic cell chamber 13 can be led out of it. The connecting pipe 27 is provided with a valve 29 and the connecting pipe 28 is provided with a valve 30.

On the other hand, the second electrolytic cell chamber 14 is enclosed by a bottom plate 31 made of a non-conductive material, a cathode plate 32 surrounding the outer periphery and made of stainless steel or the like, and a cover plate 33 made of a non-conductive material. To the cover plate 33, an anode plate 34 is fixed in the manner that it may be inward extended. In the inside of the second electrolytic cell chamber 14, a cylindrical diaphragm 35 is arranged so as to surround the anode plate 34, which diaphragm 35 partitions an anode compartment 36 and a cathode compartment 37. The diaphragm 35 has properties that it allows cations to pass from the anode compartment 36 to the cathode compartment 37 and allows anions to pass from the cathode compartment 37 to the anode compartment 36, to prevent reverse flowing of them.

The aforesaid connecting pipes 27 and 28 are connected to the bottom plate 31, of which the connecting pipe 28 is led to the above cathode compartment 37 and the connecting pipe 28 is led to the above anode compartment 36. Lead-out pipes 38 and 39 are connected to the cover plate 33, of which the lead-out pipe 38 is led to the cathode compartment 37 and the lead-out pipe 39 is led to the anode compartment 36. The lead-out pipes 38 and 39 are provided with valves 40 and 41, respectively.

A second water pipe 42 is connected between the valve 29 of the connecting pipe 27 and the bottom plate 31 via a flowmeter 43 and a valve 44. A third water pipe 45 is connected between the valve 30 of of the connecting pipe 28 and the bottom plate 31 via a flowmeter 46 and a valve 47.

On the other hand, a second mixing bath 15 used for adding NaCl is provided at a lower portion of the outlet 48 of the lead-out pipe 38, and another lead-out pipe 49 is connected to a lower part of the second mixing bath, on the way of which is provided a valve 50. To the second mixing bath 15, an NaCl-feeding pipe 52 extends from an NaCl solution tank 51 via a measuring pump 53 provided on the way of the pipe.

To obtain silver-ionic water by use of this apparatus, water is led to the ion-exchange chamber 11 through the first water pipe 16, where anions and cations present in the water is removed to a give value and the electric conductance in the water is made to be 30 to 150 $\mu\mho/cm^3$. The water demineralized in this manner is flowed out from the ion-exchange chamber to the first water pipe 16 and flowed into the first mixing bath 12 while being midway controlled by the EC control detector 18 to see whether or not the electric conductance is in a given value. To the first mixing bath 12, a predetermined amount of acetic acid is added through the acetic acid-feeding pipe from the acetic acid solution tank 19, and mixed into the water in the concentration of 0.01 to 0.4% by weight. The water to which the acetic acid has been added in this manner is led to the first electrolytic cell chamber 13 through the first water pipe 16, while being midway controlled by the EC control detector 18 to see whether or not the electric conductance is in a given value.

Here, to also simultaneously obtain acidic silver-ionic water by use of this apparatus, valves 29, 30, 40 and 41 may be opened and valves 44 and 47 may be closed, so that water is fed from the first water-feeding pipe 16. The water thus fed from the first water-feeding pipe 16 is led into the first electrolytic cell chamber 13, where silver ions are formed. Then, part of the water containing silver ions is led into the anode compartment 36 of the second electrolytic cell chamber 14 through the connecting pipe 28, and taken out from the lead-out pipe 39 in the form of acidic silver-ionic (e.g. $Ag^+$) water formed in the anode compartment 36 and having an electric conductance of 100 to 2000 $\mu\mho/cm^3$. At the same time therewith, remaining part of the water containing silver ions is led into the cathode compartment 37 of the second electrolytic cell chamber 14 through the connecting pipe 27, and taken out from the lead-out pipe 38 in the form of alkaline silver-ionic water in which $Ag(OH)_2^-$ ions, $CH_3COO^-$ ions, etc. are dissolved in the cathode compartment 37.

In connection with this, in the case the flow rate of water flowing through the first electrolytic cell chamber 13 was made to be 4.5 lit/min, the relationship between the electric power consumption and the silver ion concentration in the first electrolytic cell chamber 13 is shown in Table 11. Also, the relationship between the voltage and electric current in the second electrolytic cell chamber, the flow rate of the water flowing in the cathode compartment 37 of the second electrolytic cell chamber 14, and the pH of the water taken out from the cathode compartment 37 of the second electrolytic cell chamber 14 is shown in Table 12.

TABLE 11

| Electric power consumption | Silver ion concentration |
|---|---|
| 9.4 W | 1,000 ppb |
| 36.0 W | 1,940 ppb |

TABLE 12

| pH value | Flow rate (lit/min) | Voltage | Electric current |
|---|---|---|---|
| 3.8 | 4.6 | 100 V | 10 A |

The water in which $Ag(OH)_2^-$ ions, $CH_3COO^-$ ions, etc. are dissolved in the cathode compartment 38 is flowed into the second mixing bath 15. On the other hand, a predetermined amount of NaCl is flowed thereinto from the NaCl solution tank 51 through the NaCl-feeding pipe 52. Accordingly, the above water is mixed with 0.01 to 0.4% by weight of NaCl in the second mixing bath 51, where $Na^+$ ions, $Cl^-$ ions and so forth react with $Ag(OH)_2^-$ ions, $CH_3COO^-$ ions and so forth in the water to form complexes such as $AgCH_3COO^-$, $AgCl_2^-$, $AgCl_3^{2-}$ and so forth. Along with this course, the pH of the water once falls to pH 3.8, and gradually rises until it reaches about pH 4.2. After silver complexes was formed in this manner, the valve 50 may be opened to take out desired silver-ionic water from the lead-out pipe 49.

TEST EXAMPLE 2

Using the above apparatus according to the second embodiment of the present invention, acidic silver-ionic water each having the pH of 4.2 and a silver ion concentration of 30 ppb, 100 ppb, 500 ppb, 2,000 ppb and 1 ppm was prepared. Thereafter, a platinum loop each of *Escherichia coli* and Staphylococcus (concentration: $10^5/cm^3$) was inoculated into each solution, followed by addition of a 0.1% broth, and the movements (viable cell counts) of the bacteria were observed with time lapse while culturing them at 35° C. As a result, the viable cell counts on *Escherichia coli* were as shown in Table 13.

As to Staphylococcus, the state of growth thereof was observed based on the turbidity of the solutions to obtain the results as shown in Table 14. Thus, the acidic silver-ionic water was found to have a remarkable bacteriostatic action.

The *Escherichia coli* and Staphylococcus used in the above were further cultured to repeat experiments similar to the above several times, but there appeared no bacteria resistant to silver ions, showing the same bacteriostatic action as in the first instance. Thus, there is a feature that the appearance of resistant bacteria, which has been very usual in using conventional medicaments, is not seen at all in using this silver ions.

TABLE 13

| Contact time | Silver ion concentration | | | | | |
|---|---|---|---|---|---|---|
| | Control 0 | 30 ppb | 100 ppb | 500 ppb | 2000 ppb | 1 ppm |
| 10 min | 2000 | 160 | 100 | 0 | 0 | 0 |
| 2 hrs | 3500 | 40 | 20 | 0 | 0 | 0 |
| 4 hrs | 20000 | 10 | 0 | 0 | 0 | 0 |

TABLE 13-continued

| Contact time | Silver ion concentration | | | | | |
|---|---|---|---|---|---|---|
| | Control 0 | 30 ppb | 100 ppb | 500 ppb | 2000 ppb | 1 ppm |
| 6 hrs | 55000 | 0 | 0 | 0 | 0 | 0 |
| 24 hrs | 19000000 | 0 | 0 | 0 | 0 | 0 |
| 48 hrs | 80000000 | 0 | 0 | 0 | 0 | 0 |

TABLE 14

| Contact time | Control | 30 ppb | 100 ppb | 500 ppb | 2000 ppb | 1 ppm |
|---|---|---|---|---|---|---|
| 24 hrs | + | + | − | − | − | − |
| 48 hrs | + | + | − | − | − | − |
| 72 hrs | + | − | − | − | − | − |

Subsequently, using the silver-ionic water, tomatos were cultivated according to hydroponics under the following conditions:
Kind of tomato: Ponderozer
Cultivation room: In a glass room not heated.
Medium: Rock wool; culture solution circulation system.
Culture solution: An aqueous solution obtained by diluting "Bioaqua" (trademark; available from Sanraiku K.K. to 1/3000 with purified water.
Silver-ionic water: An aqueous solution of pH 3 diluted to 1/2000. Water was fed for 10 minutes every two hours in twenty-four hours.

Those cultivated without using the silver-ionic water were used as a control. Properties of the both culture solutions are shown in Table 15. The number of mature berries, average days for maturation, and longest term for maturation of the tomatos cultivated by use of both the culture solutions are shown in Table 16.

Thus, it is seen that the maturation of tomatos is promoted by the acidic silver-ionic water obtained by the process according to the present invention.

TABLE 15

| Properties | Purified water + Bioaqua | Silver-ionic water + Bioaqua |
|---|---|---|
| pH | 7.19 | 6.5 |
| EC | 0.46 | 0.64 |
| mʊ | 342 | 638 |
| DO | 9.1 | 21.0 |

TABLE 16

| Planted (April 5th) | Number of mature berries | Average days for maturation (day) | Longest term for maturation (day) |
|---|---|---|---|
| Purified water + Bioaqua; diluted to 1/1500 | 44 | 58.5 | 73 |
| Silver-ionic water + Bioaqua; diluted to 1/2000 | 57 | 50.1 | 54 |

Further, to know the bactericidal effect of the silver-ionic water obtained according to the production process of the present invention, a spore test was carried out in the following manner: after heated for 10 minutes using hot water of 90° C., 0.06% by weight of acetic acid was added to silver-ionic water on the anode side of an electrolyte, and the mixture was added to *B. Cereus* detected from buckwheat flour, which was then cultured in a YCC broth at 37° C. for 24 hours before the germination was recognized. Similar cultivation was also carried out in respect of *B. subtilis* (a spore suspension available from Daiichi Kagaku Yakuhin K.K.). To know bactericidal effect without heating after the above germination was recognized, silver-ioonic water having a silver ion concentration of 100 ppb and 1 ppm each, obtained by the production process according to the second embodiment of the present invention, was added to, and brought into contact with, the broth having bacterial concentration of $10^5$ to $10^6$ bacteria/ml, and thereafter the viable cell counts were examined. Results obtained are shown in Table 17.

Thus, the silver-ionic water obtained by the production process according to the present invention was found to have a remarkable bacetricidal action against *B cerus* and *B. subtilis*.

TABLE 17

| Tested bacteria | Silver ion concentration | | |
|---|---|---|---|
| | 100 ppb | 500 ppb | 1 ppm |
| *B. subtilus* | $10^3$ | 15 | 0 |
| *B. cereus* | $10^3$ | 0 | 0 |

Still further, to know the bactericidal effect against thermal resistant bacteria, of the silver-ionic water obtained by the production process of the present invention, tests were carried out in the following manner: First, into a powdery material comprising 30% of buckwheat flour and 70% of wheat four, 30% of additive water (well water) was poured to prepare soba (buckwheat). Using various kinds of silver-ionic water as water for boiling, the buckwheat was boiled at 100° C. for 3 minutes, and the bactericidal effect against *B. cereus* cultivated at 37° C. for 24 hours was examined. As a result, as shown in Table 18, the silver-ionic water according to the present invention showed most remarkable effects.

As described in the foregoing, according to the second embodiment of the present invention, water is beforehand subjected to a demineralization treatment; and organic carboxylic acid is added thereto; thereafter silver ions are dissolved out in the first electrolytic cell chamber, which is led to the cathode compartment of the second electrolytic cell chamber; NaCl is further added thereto; whereby water soluble silver ion complexes can be formed. Accordingly, it is possible to readily produce silver-ionic water that can stably retain the solubilized state for a long period of time and can show strong effect on the intended action with lower concentration.

TABLE 18

| Water for boiling | Silver ion concentration | | |
|---|---|---|---|
| | 200 ppb | 500 ppb | 1 ppm |
| Alkaline silver-ionic water + COOH | $8.2 \times 10^5$ | $2.1 \times 10^4$ | $1.8 \times 10^3$ |
| Acidic silver-ionic water + COOH | $5.7 \times 10^6$ | $4.1 \times 10^5$ | $1.1 \times 10^4$ |
| Alkaline silver-ionic water + COOH + NaCl | $3.1 \times 10^4$ | $2.1 \times 10^3$ | 60 |
| Acidic silver-ionic water + COOH + NaCl | $6.2 \times 10^5$ | $3.2 \times 10^4$ | $4.5 \times 10^3$ |
| Control (well water) | $5.6 \times 10^7$ | | |

What is claimed is:

1. A process for producing silver-ionic water, comprising;
    a step of passing weter through a first electrolytic cell chamber containing an anode and a cathode and provided with silver on the anode, under the application of a voltage, to dissolve out silver ions; and
    a step of passing the water in which said silver ions have been dissolved out, through either one or both of an anode compartment and a cathode compartment of a second electrolytic cell chamber containing an anode and a cathode and separated into said anode compartment and said cathode compartment with a disphragm formed between both of said electrodes;
    said disphragm allowing cations to pass from the anode compartment to the cathode compartment and allowing anionic ions to pass from the cathode compartment to the anode compartment, whereby the water passed from the first electrolytic cell chamber through the anode compartment of the second electrolytic cell chamber turns to acidic silver-ionic water and the water passed from the first electrolytic cell chamber through the cathode compartment of the second electrolytic cell chamber turns to alkaline silver-ionic water.

2. The process according to claim 1, wherein said acidic silver-ionic water has the pH of 5 or less and an electric conductance of 350 to 2000 $\mu$ /cm$^3$ and said alkaline silver-ionic water has the pH of 8 or more.

3. An apparatus for producing silverionic water, comprising;
    a first electrolytic cell chamber containing an anode and a cathode and provided with silver on the anode,
    a second electrolytic cell chamber containing an anode and a cathode and separated into an anode compartment and a cathode compartment with a diaphragm formed between both of said electrodes;
    a least one of a flow path in which water is passed from said first electrolytic cell chamber through anode compartment of said second electrolytic cell chamber and flowed out, and a flow path in which water is passed from said first electrolytic cell chamber through the cathode compartment of said second electrolytic cell chamber and flowed out;
    said diaphragm allowing cations to pass from the anode compartment to the cathode compartment and allowing anionic ions to pass from the cathode compartment to the anode compartment, whereby the water passed from the first electrolytic cell chamber through the anode compartment of the second electrolytic cell chamber turns to acidic silver-ionic water and the water passed from the first electrolytic cell chamber through the cathode compartment of the second electrolytic cell chamber turns to alkaline silver-ionic water.

4. The apparatus according to claim 3, wherein said apparatus further comprises a flow path in which the water is directly passed though said anode compartment of the second electrolytic cell chamber and flowed out, and another flow path in which the water is directly passed through said cathode compartment of the second electrolytic cell chamber and flowed out.

5. A process for producing silver-ionic water, comprising;
    (a) subjecting water to a demineralizing treatment to decrease ionic substances in the water;
    (b) adding an organic carboxylic acid to the ion-decreased water;
    (c) passing the water to which the organic carboxylic acid has been added, through a first electrolytic cell chamber containing an anode and a cathode and provided with silver on the anode, under the application of a voltage, to dissolve, out silver ions;

(d) passing under the application of a directcurrent voltage the water in which said silver ions have been dissolved out, through at least a cathode compartment side of a second electrolytic cell chamber containing an anode and a cathode and separated into an anode compartment and the cathode compartment with a diaphragm formed between both of said electrodes; and (e) adding sodium chloride to the water having been passed through said cathode compartment so that silver may be present in the water as a soluble complex;

said diaphragm allowing cations to pass from the anode compartment to the cathode compartment and allowing anionic ions to pass from the cathode compartment to the anode compartment, whereby the water passed from the first electrolytic cell chamber through the anode compartment of the second electrolytic cell chamber turns to acidic silverionic water and the water passed from the first electrolytic cell chamber through the cathode compartment of the second electrolytic cell chamber turns to alkaline silver-ionic water.

6. The process according to claim 5, wherein said water in step (a) is demineralized to have an electric conductance of 30 to 150 $\mu v/cm^3$.

7. The process according to claim 5, wherein said organic carboxylic acid is acetic acid.

8. The process according to claim 5, wherein said carboxylic acid is added in an amount of 0.01 to 0.4% by weight based on said water in step (b).

9. The process according to claim 5, wherein said sodium chloride is added in an amount of 1 to 10% by weight based on said water in step (e).

10. An apparatus for producing silver-ionic water, comprising;

an ion exchange chamber filled with an ion exchange material;

a first mixing bath having an organic carboxylic acid feeding means;

a first electrolytic cell chamber containing an anode and a cathode and provided with silver on the anode;

a second electrolytic cell chamber having an anode and a cathode and separated into an anode compartment and a cathode compartment with a diaphragm formed between both of said electrodes; and a second mixing bath having sodium chloride feeding means;

in such a juxtaposition that a water-feeding pipe is connected to an inlet of the ion exchange chamber, an outlet of the ion exchange chamber is connected to an inlet of the first mixing bath, an outlet of the first mixing bath is connected to an inlet of the first electrolytic cell chamber, an outlet of the first electrolytic cell chamber is separately connected to the anode compartment and cathode compartment of the second electrolytic cell chamber, the cathode compartment of the second electrolytic cell chamber is connected to the second mixing bath, a pipe for feeding additional water is connected to the flow path connecting the first electrolytic cell chamber and the anode compartment in the second electrolytic cell chamber, and a valve is provided for selectively flowing the water passed through the first electrolytic cell chamber or the additional water, into the anode compartment of the second electrolytic cell chamber, to form a flow path in which water is flowed out after being passed from said ion exchange chamber through said first mixing bath, said first electrolytic cell chamber, the cathode compartment of said second electrolytic cell chamber and said second mixing bath;

said diaphragm allowing cations to pass from the anode compartment to the cathode compartment and allowing anionic ions to pass from the cathode compartment to the anode compartment, whereby the water passed from the first electrolytic cell chamber through the anode compartment of the second electrolytic cell chamber turns to acidic silver-ionic water and the water passed from the first electrolytic cell chamber through the cathode compartment of the second electrolytic cell chamber turns to alkaline silver-ionic water.

* * * * *